(12) United States Patent
Zhang et al.

(10) Patent No.: US 11,559,744 B2
(45) Date of Patent: Jan. 24, 2023

(54) TARGETING OF AN INDIVIDUAL OBJECT AMONG A PLURALITY OF OBJECTS IN A MULTI-PLAYER ONLINE VIDEO GAME

(71) Applicant: Riot Games, Inc., Los Angeles, CA (US)

(72) Inventors: Michael Longqiang Zhang, Playa Vista, CA (US); Alexander Nixon Huang, Los Angeles, CA (US)

(73) Assignee: RIOT GAMES, INC., Los Angeles, CA (US)

( * ) Notice: Subject to any disclaimer, the term of this patent is extended or adjusted under 35 U.S.C. 154(b) by 0 days.

(21) Appl. No.: 17/482,662

(22) Filed: Sep. 23, 2021

(65) Prior Publication Data

US 2022/0152509 A1 May 19, 2022

Related U.S. Application Data

(63) Continuation of application No. 17/018,300, filed on Sep. 11, 2020, now Pat. No. 11,148,055.

(51) Int. Cl.
*A63F 13/577* (2014.01)
*A63F 13/56* (2014.01)

(52) U.S. Cl.
CPC ............ *A63F 13/577* (2014.09); *A63F 13/56* (2014.09); *A63F 2300/55* (2013.01); *A63F 2300/64* (2013.01)

(58) Field of Classification Search
CPC .... A63F 13/577; A63F 13/56; A63F 2300/55; A63F 2300/64

USPC .......................................................... 463/42
See application file for complete search history.

(56) References Cited

U.S. PATENT DOCUMENTS

| | | | |
|---|---|---|---|
| 7,394,459 | B2 | 7/2008 | Bathiche et al. |
| 8,398,487 | B2 | 3/2013 | Izumi |
| 8,425,317 | B2 | 4/2013 | Izumi |
| 8,506,371 | B2 | 8/2013 | Mimura |
| 8,784,205 | B2 | 7/2014 | Akiyama et al. |
| 2006/0022983 | A1 | 2/2006 | Gauthier et al. |
| 2013/0045783 | A1 | 2/2013 | Yamamoto et al. |

OTHER PUBLICATIONS

International Search Report and Written Opinion received for PCT Patent Application No. PCT/US2021/049566, dated Sep. 29, 2021, 7 pages.

*Primary Examiner* — Allen Chan
(74) *Attorney, Agent, or Firm* — Shook, Hardy & Bacon LLP

(57) ABSTRACT

Systems, methods, and media are provided for improved targeting of an individual object among a plurality of objects in a multi-player online video game. The video game may include plurality of objects located at various places at a given frame. At each frame, a position of the objects is identified. If a player object (except for the player object associated with the user) is within a predetermined radius of another player object, a target position of the player object is modified relative to other player objects. Next, the target position of the player object is modified towards its original position within the frame. This process is repeated for each player object until the corresponding player object is no longer within the predetermined radius of another player object or a violation of a constraints prevents the modification from being performed.

20 Claims, 5 Drawing Sheets

TARGETING OF AN INDIVIDUAL OBJECT AMONG A PLURALITY OF OBJECTS IN A MULTI-PLAYER ONLINE VIDEO GAME

CROSS REFERENCE

This patent application is a continuation of and claims priority to U.S. patent application Ser. No. 17/018,300, filed Sep. 11, 2020, and is incorporated herein by reference in its entirety.

BACKGROUND

As online multi-player gameplay moves to mobile devices and handheld touchscreen devices, size constraints of such mobile device touchscreens present various challenges. For example, multi-player online battle arena (MOBA) games or other multi-player strategy video games oftentimes involve vast virtual worlds or virtual maps in an isometric perspective view. As such the development, implementation, and functionality of graphical elements in a game's user interface (UI) are important. However, quickly and reliably choosing an intended target among a group of targets, particularly via a touchscreen, can be incredibly difficult as the level of precision required is extremely high and objects within the game space may appear clustered. Moreover, the mental model of the user may not match the actual physical arrangement of targets. Humans typically view a target in a group of targets in relative positions rather than an absolute position which leads to an overcorrection problem. For example, if a target is slightly left of another target, the user exaggerates aim to the left of the target compensate. Similarly, if a target is slightly farther away than another target, the user exaggerates aim above the target to compensate.

To address these challenges, existing solutions simply provide mitigation techniques and, in some instances, alter the core behavior of the skill to effect all possible targets in the area or prevent the skill from affecting a selected individual target. Some techniques effect the intended target alongside possible unintended targets so a lack of accuracy does not change the outcome of the game. Other techniques use targeting filters in an attempt to reduce the number of potential targets or to predict user intent by forcing the ability to effect higher priority targets. This prevents the user from being able to actually target some potential targets. Overall, the drawbacks of these mitigation techniques limit the effectiveness and perception of the UI, as well as limit the options or choices a user is able to actually perform.

BRIEF SUMMARY

Embodiments of the present disclosure relate to improved targeting of an individual object among a plurality of objects in a multi-player online video game. More specifically, embodiments relate to systems and methods for providing transparent modifications to target positions of player objects to align the appearance of the UI with the mental model of a user. In essence, the described embodiments facilitate the ability to target an individual player object that is within a predetermined radius of another player object without altering the core behavior of the skill being utilized to effect the player object.

In some example embodiments, improved targeting during a multi-player game is accomplished via a flocking engine that transparently separates different but close-together player objects so a selection algorithm can more readily distinguish distinct objects and more precisely select an individual object in a cluster of objects. For instance, a method herein can include the steps of, at each frame in the multi-player online video game, identifying a position of a plurality of objects within the frame. The type of objects may include a player object or a non-player object. For a player object that is within a predetermined radius of other player objects, a first modification to a target position of the player object relative to other player objects of the plurality of objects. A second modification towards its original position within the frame is made to the target position. One or more predetermined constraints are evaluated to determine if there is a violation of the one or more constraints. If there is a violation, the first modification and the second modification to the target position of the player object are prevented from being performed and the process stops. If there is not a violation of the one or more predetermined constraints, the first modification and the second modification to the target position is performed and the process is repeated.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DESCRIPTION OF THE DRAWINGS

The present invention is described in detail herein with reference to the attached drawing figures, wherein.

DETAILED DESCRIPTION

Figure 1:
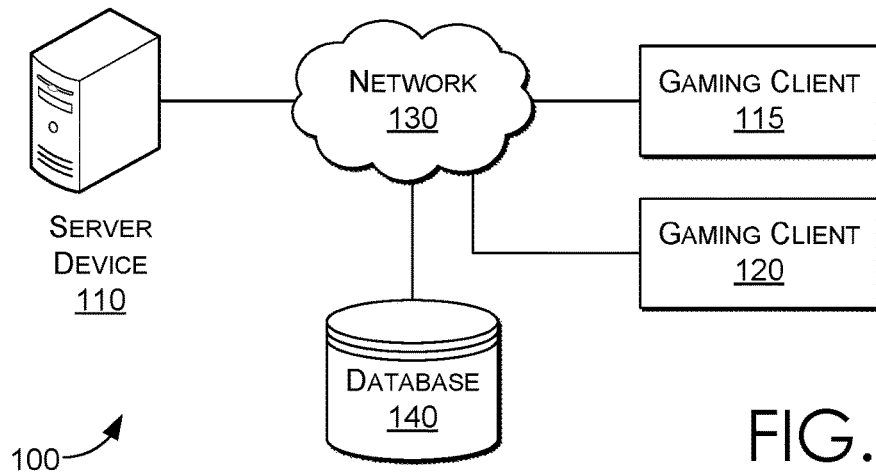
FIG. 1 depicts an exemplary operating environment in accordance with some embodiments of the present disclosure.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

The online multi-player video gaming industry has gained immense popularity across all demographics around the globe. As online multi-player video games move to mobile platforms for play on touchscreen devices, such as tablets and smart phones, some modifications are required for both how the game is displayed and how users interface with it (e.g., control the game). For instance, size constraints of touchscreens present various challenges, such as game elements appearing too small or clustered together. However, limited screen size and processing capabilities of such mobile devices have presented challenges in providing a full-featured multi-player video game via a mobile platform.

Current solutions to these challenges are merely mitigation techniques that alter the core behavior of a selected skill to affect all possible targets in the area or prevent the skill from affecting a selected individual target. For example, rather than effecting an individual target, some techniques simply effect all possible targets (the individual target and nearby possible unintended targets) so a lack of accuracy does not change the outcome of the game. In another example, targeting filters may be utilized to reduce the number of potential targets or to predict user intent by forcing the skill to effect the highest priority targets within a cluster. This prevents the user from being able to actually target some potential targets. Overall, the drawbacks of these mitigation techniques limit the effectiveness and perception of the UI.

As such, various embodiments of the present disclosure are directed to a system and computer-implemented method for enabling high precision in a densely packed group of targets while avoiding techniques that alter the core behavior of a skill being utilized to effect a target. In this way, the visual logic relative positioning of the objects within each frame of the game can be preserved while increasing the selection space available to a given player object despite actual positions of the player objects being very compressed. To do so, an iterative algorithm gradually pushes the player objects against each other (while taking smaller iterative steps back to the original position of each player object) until the player objects are separated just far enough, up to and without violating any constraints, to match the perceived position of the player objects by the user.

Turning now to FIG. 1, a schematic depiction is provided illustrating one exemplary operating environment 100 of which an embodiment of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a server device 110 that provides a service to one or more client devices, such as gaming clients 115,120, for instructing game play and/or settings in a virtual gaming environment over a network 130, such as the Internet. The gaming clients 115,120 may be implemented on one or more processors as later described herein. In some embodiments, the gaming clients 115,120 are mobile electronic devices having touchscreens thereon, such as smart phones, tablets, or laptop computers. The server device 110 and the gaming clients 115,120 may communicate in a wired or wireless manner over the network 130.

In some embodiments, the server device 110 is coupled, directly or indirectly, to a database 140 for facilitating the storage and querying of records corresponding to a plurality of game play instructions, actions, objects (e.g., virtual game pieces/characters, weapons, buildings, etc.), maps, and/or settings. The database 140 includes, among other things, a relational database or similar storage structure accessible by the server device 110. In accordance with embodiments described herein, the database 140 stores a plurality of records that each corresponds to game play instructions, actions, objects, maps, and/or settings.

The server device 110 includes a gaming server accessible by any of the gaming clients 115,120 and/or a data server for supporting an application of any of the gaming clients 115,120, over the network 130. The gaming server can support any type of application, including those that facilitate live game play. The server device 110 can further determine relationships (e.g., teams) between the gaming clients 115,120. In various embodiments, the server device 110 communicates actions commanded via one or more of the gaming clients 115,120, to another one or more of the gaming clients 115,120 for presentation thereon via user interfaces or the like, as later described herein.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, one or more private networks, and/or one or more telecommunications networks. Where network 130 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 130 is not described in significant detail.

In accordance with embodiments of the present disclosure, the server device 110 or the gaming clients 115, 120 can each be a computing device that is capable of accessing the Internet, such as the World Wide Web, and/or a telecommunications network. Either one of the server device 110 or the gaming clients 115, 120 might take on a variety of forms, such as a personal computer (PC), a laptop computer, a mobile phone, a tablet computer, a wearable computer, a personal digital assistant (PDA), an MP3 player, a global positioning system (GPS) device, a video player, a handheld communications device, a smartphone, a smart watch, a workstation, any combination of these delineated devices, or any other suitable device.

It should be understood that any number of the aforementioned devices may be employed in operating environment 100 within the scope of the present disclosure. Each may comprise a single device or multiple devices cooperating in a distributed environment. Additionally, other components not shown may also be included within the distributed environment. It should further be understood that operating environment 100 shown in FIG. 1 is an example of one suitable computing system architecture. Each of the servers, gaming clients, networks, and databases shown in FIG. 1 may be implemented via a computing device, such as computing device 600, later described with reference for FIG. 6, for example. The components may communicate with each other via network 130.

Figure 2:
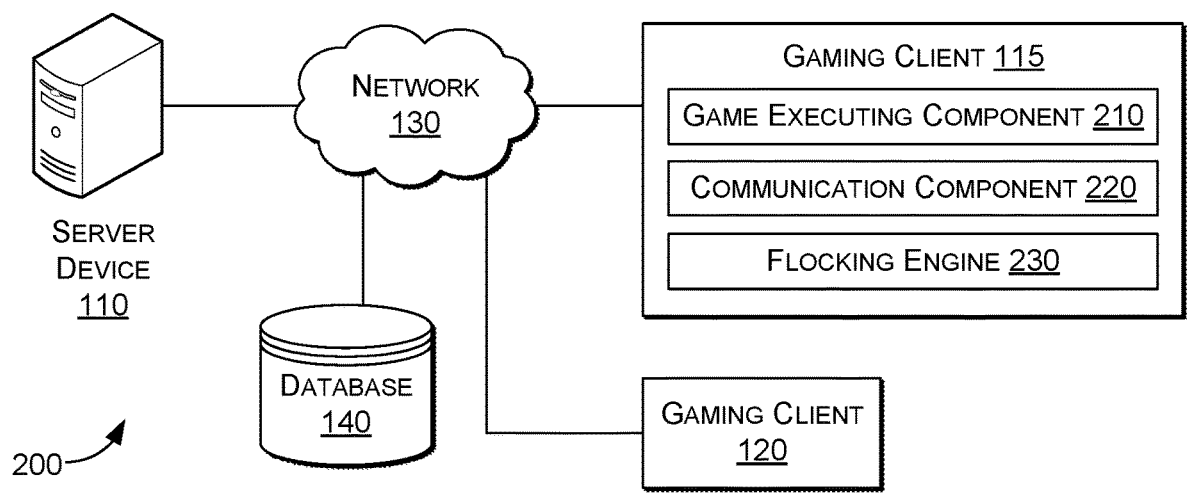
FIG. 2 is a block diagram illustrating an exemplary implementation of a system for providing improved targeting of an individual object among a plurality of objects in a multi-player online video game in accordance with some embodiments of the present disclosure.

Next, FIG. 2 depicts a block diagram of operational modules of an exemplary one of the gaming clients, specifically gaming client 115, in accordance with some embodiments of the present disclosure. It is noted that the depicted implementation is merely exemplary, and not intended to be limiting in any way, as each component can be arranged in various configurations, spread across a number of computing devices, combined with other components or one another, arranged to communicate over a network, or any combination of the foregoing including others not mentioned. For example, each of the operational modules may comprise a combination of hardware components and/or computer instructions stored on computer-readable media and executable on a processor thereof, as later described in regards to computing device 600 below.

As depicted in FIG. 2, the operational modules of the gaming client 115 may comprise a game executing component 210, a communication component 220, and a flocking engine 230. The game executing component 210 can be configured for executing a game associated therewith, such as MOBA games described herein. In some embodiments, executing the game may include displaying a dynamic image, such as dynamic image 400 depicted in FIG. 4, and various manipulatable features therein, such as menus, virtual joysticks, fixed and/or movable objects, or the like. The communication component 220 can be configured for network communications between the gaming client 115, the gaming client 120, and/or the server device 110 via network 130. Generally, the flocking engine 230 can be configured for transparently separating different, but close-together player objects, so a selection algorithm can more readily distinguish distinct objects and more precisely select an individual object in a cluster of objects.

Figure 3:
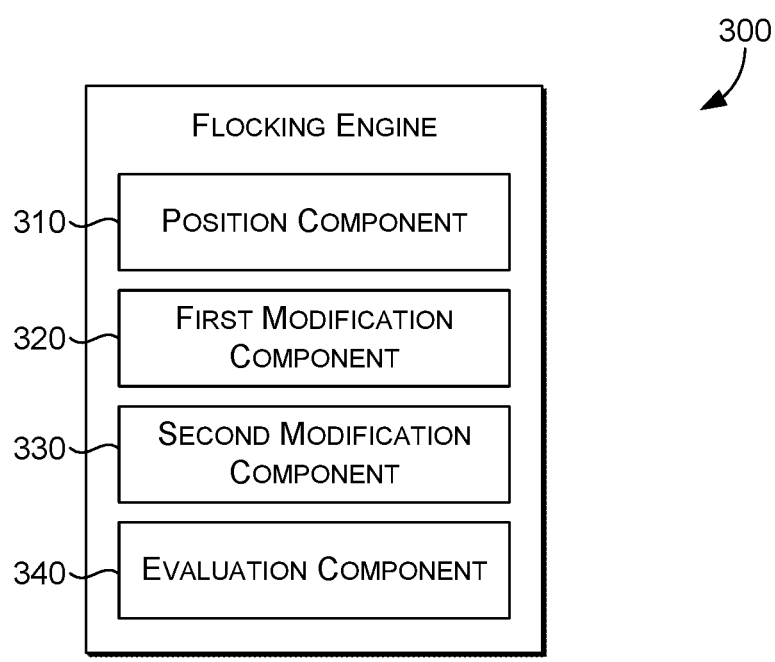
FIG. 3 is a block diagram illustrating an exemplary implementation of a flocking engine in accordance with some embodiments of the present disclosure.

As shown in FIG. 3, the flocking engine includes several components. For example, the flocking engine may include a position component 310, a modification component 320, and an evaluation component 330. Initially, the position component 310 identifies, at each frame in the multi-player online video game, a position of each object. For each player object, the position component 310 may determine if a particular player object is within a predetermined radius of another player object. In an example, if the position component 310 determines a first player object is not within proximity (i.e., is not close enough) to a second player object, then the flocking engine may not initially take any further action with respect to movement of the target position of the first player object away from the second player object. However, if at another frame in the multi-player online video game, the position component 310 determines the first player object is within the predetermined radius of the second player object, then the flocking engine may take action to move the target position of the first player object away from the second player object.

Assuming the position component 310 determines the first player object is within the predetermined radius of the second player object, the modification component 320 begins to move the target position of the first player object away from the second player object. To do so, the modification component 320 determines a first modification to the target position of the first player object relative to the second player object. In this respect, the first modification pushes the target position of the first player object directly away from the second player object.

Next, the modification component 320 determines a second modification to the target position of the player object. The second modification is a movement of the target position of the first player object that is typically less than the first movement, towards the actual position of the first player object. In a sense, the second modification helps preserve the integrity of game player by more closely aligning the target position of the first player object with the actual position of the player object.

In some embodiments, the modification component 320 determines a third modification to the target position of the player object. The third modification is a movement of the target position of the first player object that preserves the angular relationship between the target position of the first player object and the target position of other player objects within a predetermined radius. In other words, the third modification is made to more closely align the relationship of the target position of the first player object with the target position of other player objects.

In some embodiments, the modification component 320 applies weights to one or more of the modification of the target positions of player objects. For example, the modification component may apply an increased weight to the first modification of the target position if the player object is closer to the player object corresponding to the user than if the player object is farther away from the player object corresponding to the user. In this way, target positions of closer player objects are modified more than target positions of farther away objects. Additionally, the modification component 330 may prevent modifications to target positions that cross over another non-player or player object. In some embodiments, the modification component 330 enables partial movements such that the movement is performed right up to the point that a constraint would be exceeded.

Finally, evaluation component 330 evaluates one or more predetermined constraints. The predetermined constraints may comprise one or more of an angle constraint, a closeness constraint, a farthest constraint, and/or a maximum distance constraint. As described in more detail below, a violation of one of the one or more predetermined constraints prevents the first modification and the second modification to the target position of the player object from being performed. On the other hand, if any of the predetermined constraints are not violated, the first modification and the second modification are performed to the target position and the entire process repeats itself for the player object until a constraint is violated for the target position of the player object.

Figure 4:
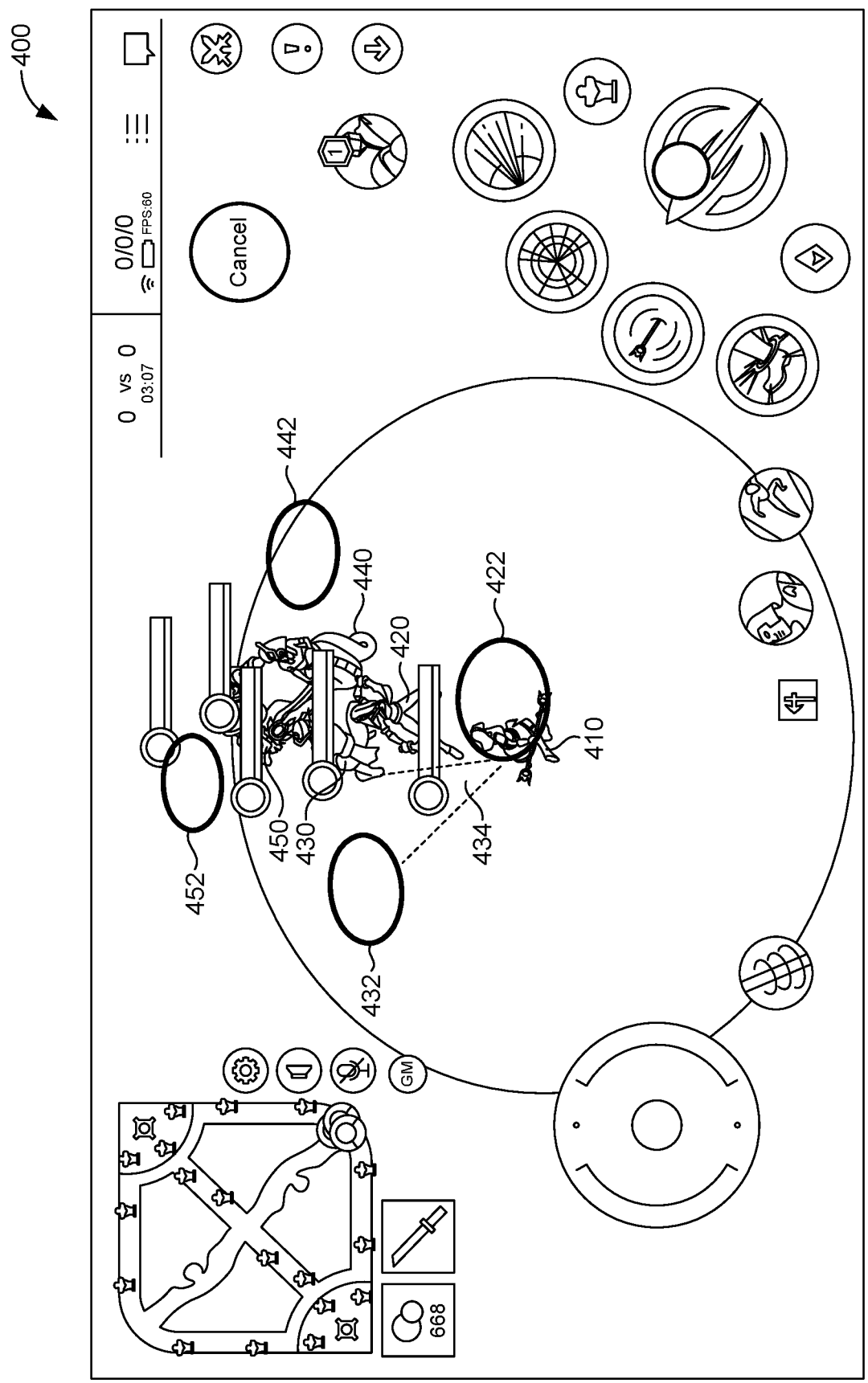
FIG. 4 is the exemplary image illustrating the modification of target positions for player objects in accordance with some embodiments of the present disclosure.

Turning now to FIG. 4, an example depiction of a dynamic image 400 is presented on a display screen, such as a touchscreen of a mobile electronic device. The mobile electronic device can include the computing device 600 as described below and depicted in FIG. 6. Likewise, the touchscreen can comprise any of the I/O components 620 described below and depicted in FIG. 6. For example, the touchscreen can particularly comprise embodiments of I/O components 620 with gesture recognition on screen and touch recognition associated with a display of the computing device 600.

The dynamic image 400 can include movable images or images with objects movable in real-time therein, such as video images, animated images, images comprising movable game pieces, or the like. For example, the dynamic image 400 can include visual depictions of at least a portion of a dynamic virtual world for a multi-player game (e.g., a MOBA game or the like). The visual depictions can comprise fixed graphic objects and movable graphic objects. Visual depictions can include, among other things, animated and/or movable game pieces and/or destinations such as towers, castles, roads, pathways, walls, fences, barricades, trees, mountains, streams, weapons, targets, rewards, or the like. Game pieces, such as player objects 410, 420, 430, 440, 450, can represent locations of various players in the multi-player game and/or tools or weapons useable by the various players. The visual depictions can display such fixed or movable graphic objects in a perspective view and/or a plan view. However, the system and methods herein can be used within other dynamic images that are not part of a multi-player game or a single player game without departing from the scope of the technology described herein.

In some embodiments, a player can cause specific actions to be performed at particular locations within the dynamic virtual world, such as targeting another player object with a selected ability (e.g., a weapon or skill). As shown, player object 410 corresponds to the user, while player objects 420, 430, 440, and 450 correspond to other player objects. To illustrate the advantages gained by flocking engine, target positions 422, 432, 442, 452 that are typically transparent to the user, are depicted in FIG. 4. The target positions 422, 432, 442, 452 are the result of the various modifications as described herein and are meant to align with the mental model of the user without being visibly or otherwise projected to the user. Moreover, the target positions 422, 432, 442, 452 represent the physical center of the target needed to effect on ability on player objects 420, 430, 440, 450.

For example, the position of each of player objects 420, 430, 440, and 450 are initially identified at the particular frame shown by dynamic image 400. In this example, the position of each player object is determined to be within a predetermined radius of each other. A target position 422 of player object 420 is first modified such that the target position 422 is pushed away from the other player objects 430, 440, 450. As shown, the target position 422 is modified towards the player object corresponding to the user 410. A second modification is made to the target position 422 of player object 420 back towards its original position (i.e., the position of player object 420).

Next, several predetermined constraints are evaluated. A violation of one of the one or more predetermined constraints prevents the first modification and the second modification to the target position of the player object from being performed. On the other hand, no violation of any of the predetermined constraints causes the first modification and the second modification to the target position to be performed and the entire process repeats itself for the player object until a constraint is violated for the target position of the player object. Additionally, the entire process is repeated for the other player objects, also until a constraint is violated for a target position of each of the other player objects. In some embodiments, an additional partial modification may be made such that the movement is taken right up to the position where any further movement would violate the constraint.

The predetermined constraints may comprise an angle constraint, a closeness constraint, a farthest constraint, and/or a maximum distance constraint. The angle constraint is a maximum angle difference for an angle represented by a target position of the player object, an object corresponding to a user, and the original position of the player object. To illustrate, and referring to player object 430, assume the target positions 432 of player object 430 has been through one or more iterations of the process. At some point, the angle 434 formed by the target positions 432 of player object 430, player object 410 (i.e., the object corresponding to the user), and the player object 430 will exceed a predetermined constraint, the modifications are not performed and the process is complete, at least for the player object 430, within that frame.

The closeness constraint is a minimum distance between the target position of the player and an object corresponding to a user. As an example, assume the target position 422 of player object 420 has been modified as illustrated in FIG. 4. As shown, the target position 422 of player object 420 has been modified to be in very close proximity to player object 410. To maintain a minimum distance between the target position 422 of player object 420 and player object 410 (i.e., the player object corresponding to the user), the closeness constraint prevents a modification to the target position 422 of player object 420 that exceeds the constraint. In other words, the closeness constraint prevents the target position 422 of player object 420 from getting too close to the position of player object 410.

The farthest constraint is a maximum distance between the target position of the player object and the position of the player object. To illustrate, assume the target position 442 of player object 440 has been modified as illustrated in FIG. 4. If the modifications continue, the target position 442 of player object 440 continue to move further away from player object 440. To prevent this from occurring, the farthest constraint prevents a modification to the target position 442 of player object 440 that exceeds the constraint. In this way the target position 442 of player object 440 does not get too far away from the position of player object 440.

The maximum distance constraint is a maximum distance between the target position of the player object and the object corresponding to a user. The maximum distance constraint may prevent a movement even when all other constraints are not violated. As an example, the target position 452 of player object 450 has been modified to be outside the target range of an ability being utilized by the player object 410 corresponding to the user even though the player object 450 is still within range. To prevent this from occurring, the maximum distance constraint prevents a modification to the target position 452 of player object of player object 450 from being modified too far away from the player object 410. In essence, this keeps the target position 452 of player object 450 within range while the player object 450 remains within range.

Figure 5:
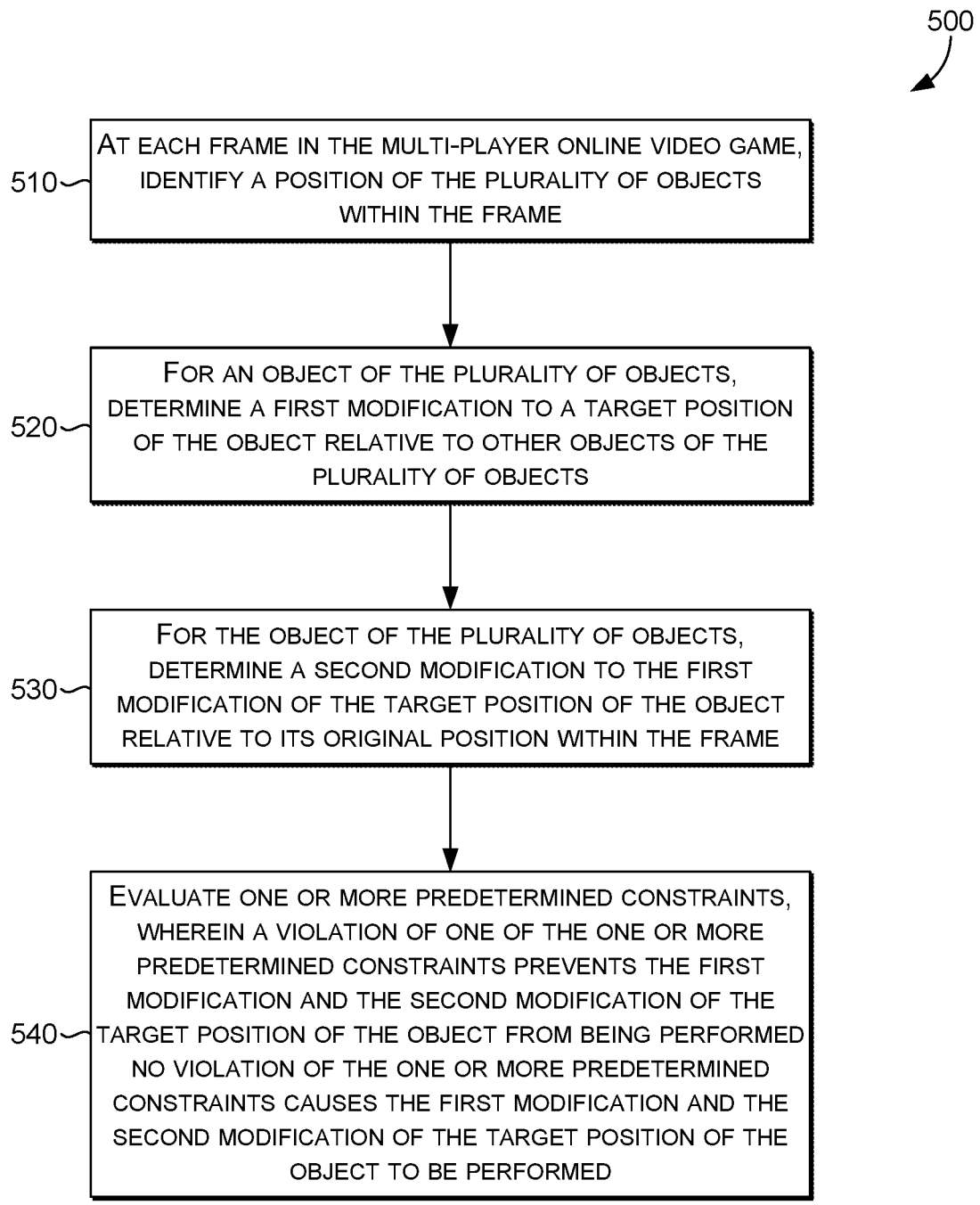
FIG. 5 is a flow diagram depicting a method for providing improved targeting of an individual object among a plurality of objects in a multi-player online video game in accordance with some embodiments of the present disclosure.

Now referring to FIG. 5, each block of method, described herein, comprises a computing process that can be performed using any combination of hardware, firmware, and/or software. For instance, various functions can be carried out by a processor executing instructions stored in memory. The method can also be embodied as computer-usable instructions stored on computer storage media. The method 500 can be provided by a standalone application, a service or hosted service (standalone or in combination with another hosted service), or a plug-in to another product, to name a few. For example, as described herein, the method 500 is a virtual tool within other software such as a virtual game. In addition, the method 500 is described, by way of example, with respect to the dynamic image on the touchscreen of FIG. 4. However, these methods can additionally or alternatively be executed by any one system, or any combination of systems, including, but not limited to, those described herein.

FIG. 5 is a flow diagram depicting a method 500 for providing improved targeting of an individual object among a plurality of objects in a multi-player online video game, in accordance with some embodiments of the present disclosure. In accordance with various embodiments, the method 500 can be employed to transparently redirect a player's aim to match their mental model and enable much more precise targeting. As depicted in block 510, the method 500 can comprise a step of, at each frame in the multi-player online video game, identifying a position of the plurality of objects within the frame. The objects may comprise a player object or a non-player object.

Furthermore, as depicted in block 520, the method 500 can comprise, for a player object of the plurality of objects, determining a first modification to a target position of the player object relative to other player objects of the plurality of objects. The target position indicates a position within the frame that, upon targeting the target position, causes an effect on the corresponding object. The first modification is a first iterative movement of the target position of the player object away from the other player objects. As such, the first modification is dependent on the type of the other objects. In other words, the movement of the target position of the player object is only influenced by the frame-by-frame position of other player objects and not of non-player objects.

As depicted in block 530, the method 500 can also comprise, for the player object of the plurality of objects, determining a second modification to the target position of the player object relative to its original position within the frame. The second modification is a second iterative movement less than the first iterative movement towards an original position of the player object. In this way, the second movement is a movement of the target position of the player object back towards the actual position of the player object within the frame.

In some embodiments, a third modification to the target position of the player object is determined to preserve the angular relationship of the other player objects within a predetermined radius. To illustrate, assume there is a player object and two other player objects within the predetermined radius. Together, the three objects form an equilateral triangle shape. As the target position of the player objects become pushed apart, they may start forming a lopsided triangle shape. To prevent this, the third modification may be made to the first modification and the second modification to restore or preserve the angular position so the angular position of the target positions of the three player objects matches or is similar to the angular position of the three player targets.

The method 500 can also comprise, as depicted in block 540, evaluating one or more predetermined constraints, wherein a violation of one of the one or more predetermined constraints prevents the first modification and the second modification to the target position of the player object from being performed and no violation of the one or more predetermined constraints causes the first modification and the second modification to the target position to be performed.

In embodiments, the predetermined constraints comprise an angle constraint, a closeness constraint, a farthest constraint, a maximum distance constraint. The angle constraint is a maximum angle difference for an angle represented by a target position of the player object, an object corresponding to a user, and the original position of the player object. The closeness constraint is a minimum distance between the target position of the player and an object corresponding to a user. The farthest constraint is a maximum distance between the target position of the player object and the position of the player object. The maximum distance constraint is a maximum distance between the target position of the player object and the object corresponding to a user.

At each frame in the multi-player online video game, the type of each object of the plurality of objects is identified as a player object or a non-player object. In embodiments, the method of blocks 510, 520, 530, and 540 is repeated for the player object and all other player objects (excluding the player object corresponding to the user) until one of the one or more predetermined constraints is violated. For clarity, the method of blocks 510, 520, 530, and 540 is not performed on non-player objects or the player object corresponding to the user. In some embodiments, it is determined whether a second player object of the plurality of objects is within a predetermined radius of the player object. If the second player object is within the predetermined radius of the player object, the method of blocks 510, 520, 530, and 540 is performed with respect to the player object and the second player object. If the second player object is not within the predetermined radius of the player object, the method of blocks 510, 520, 530, and 540 will not be performed with respect to the player object and the second player object. In other words, there will not be any movement of the target position of the player object based on the position of the second player object.

Figure 6:
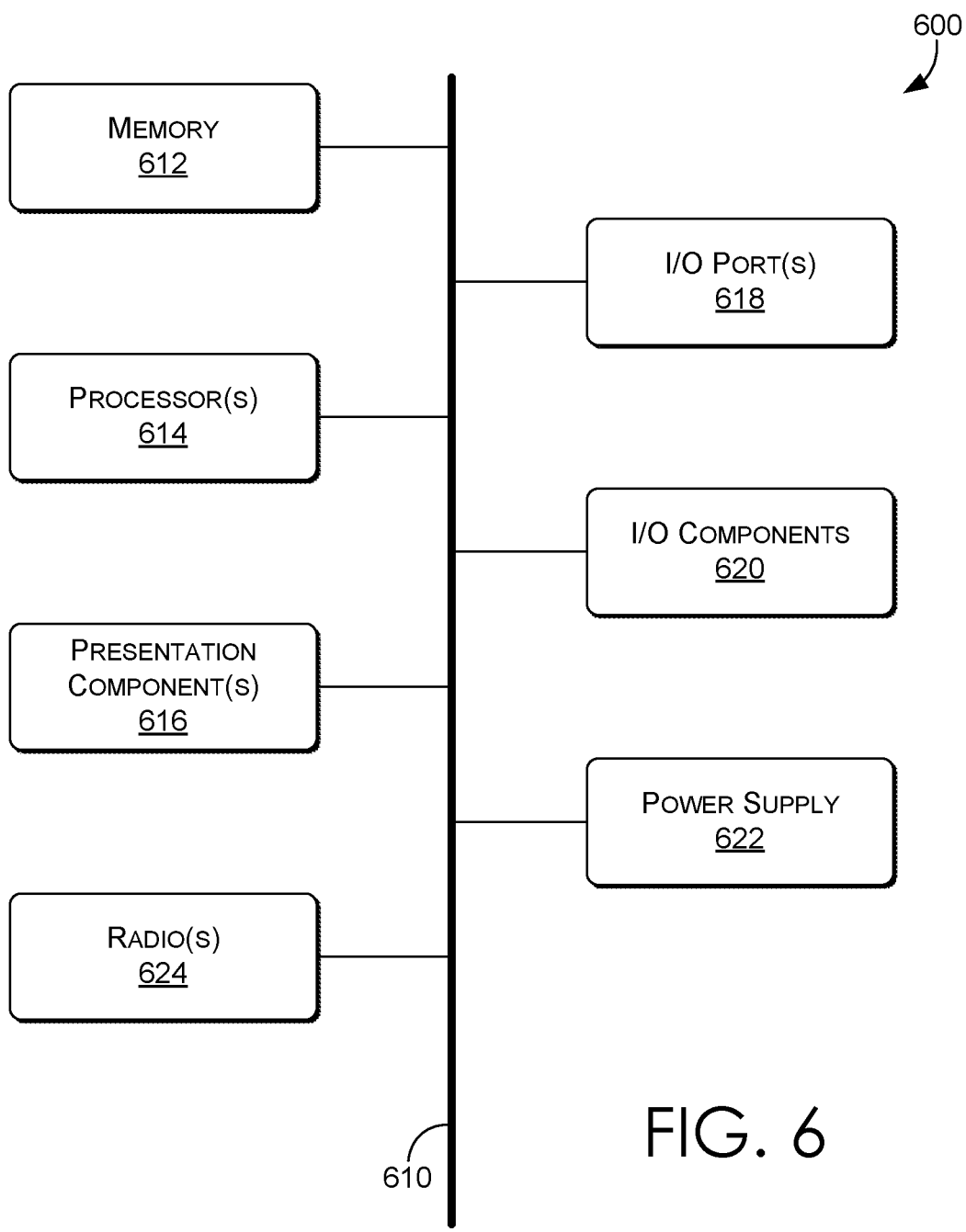
FIG. 6 is a block diagram of an exemplary computing environment suitable for use in implementing some embodiments of the present disclosure.

Having described embodiments of the present disclosure, an exemplary operating environment in which embodiments of the present disclosure can be implemented is described below in order to provide a general context for various aspects of the present disclosure. Referring initially to FIG. 6 in particular, an exemplary operating environment for implementing embodiments of the present disclosure is shown and designated generally as computing device 600. Computing device 600 is but one example of a suitable computing environment and is not intended to suggest any limitation as to the scope of use or functionality of the disclosed embodiments. Neither should the computing device 600 be interpreted as having any dependency or requirement relating to any one or combination of components illustrated.

The embodiments herein can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments can be practiced in a variety of system configurations, including hand-held devices, consumer electronics, general-purpose computers, more specialty computing devices, etc. The described embodiments can also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, input/output (I/O) components 620, and an illustrative power supply 622. In some example embodiments, the computing device 600 can be or can comprise a mobile electronic device such as a smart phone, tablet, touchscreen laptop, or the like. Bus 610 represents what can be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory can be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which can be built in. Illustrative components include a microphone, joystick, game pad, satellite dish, scanner, printer, wireless device, etc. The I/O components 620 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 can be equipped with depth cameras, such as stereoscopic camera systems, infrared camera systems, RGB camera systems, touchscreen technology, and combinations of these, for gesture detection and recognition. Additionally, the computing device 600 can be equipped with accelerometers or gyroscopes that enable detection of motion. The output of the accelerometers or gyroscopes can be provided to the display of the computing device 600 to render immersive augmented reality or virtual reality.

As can be understood, embodiments of the present disclosure provide for, among other things, systems and methods for precise positioning on a touchscreen. The present disclosure has been described in relation to particular embodiments, which are intended in all respects to be illustrative rather than restrictive. Alternative embodiments will become apparent to those of ordinary skill in the art to which the present disclosure pertains without departing from its scope. From the foregoing, it will be seen that embodiments of the present disclosure are one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

We claim:

1. A computer implemented method for providing improved targeting of an individual object among a plurality of objects in a multi-player online video game, the method comprising:
   identifying a position of a player object within a frame in the multi-player online video game;
   determining a first modification to a target position of the player object relative to other player objects, wherein the first modification is a first iterative movement away from the other player objects;
   determining a second modification to the target position of the player object relative to its original position within the frame, wherein the second modification is a second iterative movement less than the first iterative movement; and
   evaluating whether the first modification and the second modification to the target position of the player object violates a predetermined constraint.

2. The method of claim 1, further comprising, upon determining the first modification and the second modification to the target position of the player object violates the predetermined constraint, preventing the first modification and the second modification to the target position of the player object from being performed.

3. The method of claim 1, further comprising, upon determining the first modification and the second modification to the target position of the player object does not violate the predetermined constraint, causing the first modification and the second modification to the target position to be performed.

4. The method of claim 1, wherein the first modification is a first iterative movement away from the other player objects and the second modification is a second iterative movement less than the first iterative movement towards an original position of the player object.

5. The method of claim 1, wherein the target position indicates a position within the frame that, upon targeting the target position, causes an effect on the corresponding object.

6. The method of claim 1, wherein the one or more predetermined constraints comprise: an angle constraint that represents a maximum angle difference for an angle represented by a target position of the player object, an object corresponding to a user, and the original position of the player object, a closeness constraint that represents a minimum distance between the target position of the player and an object corresponding to a user, a farthest constraint that represents a maximum distance the target position of the first player object can be modified relative to the position of the first player object, or a maximum distance constraint that represents a maximum distance the target position of the first player object can be modified relative to an object corresponding to a user.

7. The method of claim 1, further comprising determining a second player object is within a predetermined radius of the player object.

8. The method of claim 1, further comprising:
determining a second player object is not within a predetermined radius of the player object; and
prevent any modifications of the target position of the player object relative to the second player object.

9. Non-transitory computer readable media storing instructions that when executed by a processor cause the processor to perform operations for providing improved targeting of an individual object among a plurality of objects in a multi-player online video game, the operations comprising:
identifying a position of a player object within a frame in the multi-player online video game;
determining a first modification to a target position of the player object relative to other player objects, wherein the first modification is a first iterative movement away from the other player objects;
determining a second modification to the target position of the player object relative to its original position within the frame, wherein the second modification is a second iterative movement less than the first iterative movement; and
evaluating whether the first modification and the second modification to the target position of the player object violates a predetermined constraint.

10. The computer readable media of claim 9, further comprising, upon determining the first modification and the second modification to the target position of the player object violates the predetermined constraint, preventing the first modification and the second modification to the target position of the player object from being performed.

11. The computer readable media of claim 9, further comprising, upon determining the first modification and the second modification to the target position of the player object does not violate the predetermined constraint, causing the first modification and the second modification to the target position to be performed.

12. The computer readable media of claim 9, wherein the first modification is a first iterative movement away from the other player objects and the second modification is a second iterative movement less than the first iterative movement towards an original position of the player object.

13. The computer readable media of claim 9, wherein the target position indicates a position within the frame that, upon targeting the target position, causes an effect on the corresponding object.

14. The computer readable media of claim 9, wherein the one or more predetermined constraints comprise: an angle constraint that represents a maximum angle difference for an angle represented by a target position of the player object, an object corresponding to a user, and the original position of the player object, a closeness constraint that represents a minimum distance between the target position of the player and an object corresponding to a user, a farthest constraint that represents a maximum distance the target position of the first player object can be modified relative to the position of the first player object, or a maximum distance constraint that represents a maximum distance the target position of the first player object can be modified relative to an object corresponding to a user.

15. A computerized system for providing improved targeting of an individual object among a plurality of objects in a multi-player online video game comprising:
one or more processors; and
a non-transitory computer storage media storing computer-useable instructions that, when used by the one or more processors, cause the one or more processors to:
identify a position of a player object within a frame in the multi-player online video game;
determine a first modification to a target position of the player object relative to other player objects, wherein the first modification is a first iterative movement away from the other player objects;
determine a second modification to the target position of the player object relative to its original position within the frame, wherein the second modification is a second iterative movement less than the first iterative movement; and
evaluate whether the first modification and the second modification to the target position of the player object violates a predetermined constraint.

16. The system of claim 15, further comprising, upon determining the first modification and the second modification to the target position of the player object violates the predetermined constraint, preventing the first modification and the second modification to the target position of the player object from being performed.

17. The system of claim 15, further comprising, upon determining the first modification and the second modification to the target position of the player object does not violate the predetermined constraint, causing the first modification and the second modification to the target position to be performed.

18. The system of claim 15, wherein the first modification is a first iterative movement away from the other player objects and the second modification is a second iterative movement less than the first iterative movement towards an original position of the player object.

19. The system of claim 15, wherein the target position indicates a position within the frame that, upon targeting the target position, causes an effect on the corresponding object.

20. The system of claim 15, wherein the one or more predetermined constraints comprise: an angle constraint that represents a maximum angle difference for an angle represented by a target position of the player object, an object corresponding to a user, and the original position of the player object, a closeness constraint that represents a minimum distance between the target position of the player and an object corresponding to a user, a farthest constraint that represents a maximum distance the target position of the first player object can be modified relative to the position of the first player object, or a maximum distance constraint that represents a maximum distance the target position of the first player object can be modified relative to an object corresponding to a user.

* * * * *